Figure 1:
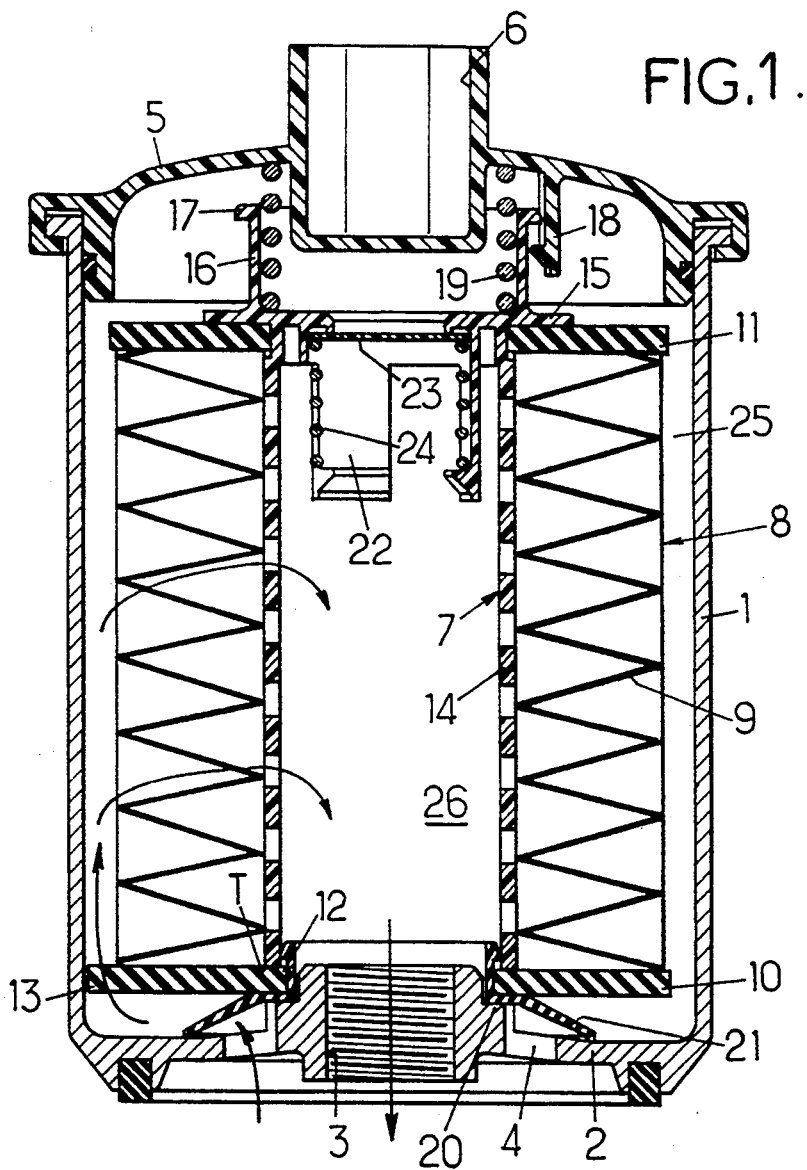

United States Patent [19]

Gewiss et al.

[11] Patent Number: 5,413,712
[45] Date of Patent: May 9, 1995

[54] FILTER CARTRIDGES FOR LIQUID, AND TO FILTERS FITTED WITH SUCH CARTRIDGES

[75] Inventors: Michel Gewiss, Osse; Thierry Becker, Maurepas, both of France

[73] Assignee: Filtrauto, France

[21] Appl. No.: 95,857

[22] Filed: Jul. 23, 1993

[30] Foreign Application Priority Data

Jul. 23, 1992 [FR] France .................. 92 09100

[51] Int. Cl.6 .................. B01D 27/08; B01D 27/06
[52] U.S. Cl. .................. 210/450; 210/451; 210/453; 210/455; 210/457; 210/493.1; 210/497.01; 55/498; 55/500; 55/502; 55/521
[58] Field of Search ............. 210/435, 450, 451, 455, 210/457, 493.1, 493.2, 493.5, 497.01, 497.2, 453; 55/490, 497, 498, 500, 502, 510, 521

[56] References Cited

U.S. PATENT DOCUMENTS

| | | | |
|---|---|---|---|
| 2,726,184 | 12/1955 | Cox et al. | 210/493.2 |
| 3,272,336 | 9/1966 | Humbert, Jr. | |
| 5,211,846 | 5/1993 | Kott et al. | 210/493.2 |
| 5,250,179 | 10/1993 | Spearman | 210/497.01 |

FOREIGN PATENT DOCUMENTS

| | | | |
|---|---|---|---|
| 2187387 | 1/1974 | France . | |
| 2214505 | 8/1974 | France . | |
| 2226199 | 12/1974 | France | 210/493.2 |
| 1536865 | 1/1970 | Germany . | |
| 3514778 | 8/1986 | Germany . | |
| 2030464 | 4/1980 | United Kingdom | 210/493.2 |

*Primary Examiner*—Robert A. Dawson
*Assistant Examiner*—W. L. Walker
*Attorney, Agent, or Firm*—Larson and Taylor

[57] ABSTRACT

A filter cartridge for a liquid is designed to be removably received in a housing and comprises a tubular filter element of zig-zag folded paper having two ends that are secured to two respective flexible washers. The cartridge does not have any central reinforcement of its own and its washers co-operate directly for sealing purposes with appropriate annular bearing surfaces of a perforated rigid tube that is included in the housing: the cartridge is therefore easily discarded or degraded after use.

6 Claims, 1 Drawing Sheet

FILTER CARTRIDGES FOR LIQUID, AND TO FILTERS FITTED WITH SUCH CARTRIDGES

The invention relates to filter cartridges for liquid that are designed to be mounted in filter bodies or housings in removable manner to enable them to be replaced after becoming worn or clogged, and it also relates to said bodies or housings, and more particularly it relates to circumstances where said cartridges comprise a tubular filter element of folded paper with two washers firmly secured at respective ends.

In most known embodiments of such cartridges, the two washers are made of metal or other rigid material and they are secured to the filter element by gluing, while being spaced apart by a perforated inside metal tube that opposes major deformation of said element, whether radial or axial.

In general, such known removable cartridges give satisfaction in use, however they present a certain number of drawbacks, and in particular the following:

- the cartridges are not fully recyclable or degradable because of the presence in each of them of metal portions or the like (washers and central tubes); however, there is ever-increasing demand for the worn and replaceable elements of engines to be suitable, after use, for being recycled or disposed of simply, in particular by incineration; and
- in order to obtain good sealing between the end washers and the facing bearing surfaces of the housings, deformable annular gaskets need to be interposed between such cartridges and their housings in such a manner as to be compressed once they are installed: naturally, the gaskets must remain in a state enabling them to perform the sealing for which they are provided, in particular they must continue to be elastically deformable, and this can give rise to problems in the long run.

To simplify problems relating to sealing between the washers and the facing bearing surfaces of the cartridge-receiving housings, there have already been proposals to make such washers out of flexible material.

However, in the embodiments proposed for such cartridges (document FR-A-2 214 505) the cartridges are not provided with perforated inside tubes, even after they have been installed in their respective housings, and as a result they do not provide sufficient resistance against deformation, in particular when the filter element becomes clogged.

An object of the invention is above all to remedy these various drawbacks.

To this end, the present invention provides a filter for liquid comprising firstly a filter cartridge itself including a tubular filter element of folded paper having no central perforated rigid tube and having its two ends firmly secured to two flexible washers, and secondly a housing for receiving the filter cartridge and comprising a cylindrical tank and a cover, wherein the filter contains a perforated rigid tube mounted axially on the cover, the outside diameter of the tube being substantially equal to the inside diameter of the cartridge, and the tube presenting annular bearing surfaces at its two ends against which the two washers of the cartridge come to bear automatically, at least when the cover fitted with the cartridge is installed on the tank.

In preferred embodiments, one or more of the following dispositions are also used:

- the inside diameter of one of the washers is smaller than the inside diameter of the filter element;
- one of the bearing surfaces of the rigid tube is a terminal axial edge of said tube suitable for bearing against the radial rim of the cartridge washer of the preceding paragraph, which rim projects inwardly from the inside surface of the cartridge;
- one of the bearing surfaces of the rigid tube is an annular portion of the outside cylindrical face of said tube suitable for being contiguously surrounded by the inside cylindrical edge of one of the washers;
- one of the bearing surfaces of the rigid tube is a collar extending an end of said tube radially outwards and against which the inside portion of the outside transverse plane face of one of the washers comes to bear axially;
- the paper is folded with a "zig-zag accordion" type of folding, i.e. it is folded along zig-zag bent lines not only in the circumferential direction but also in the axial direction, thereby facilitating small deformations of the entire cartridge in any direction in three dimensions; and
- the rigid tube is installed on the cover by means of a telescopic coupling urging the rigid tube to move axially away from the cover.

In addition to the above main dispositions, the invention includes certain other dispositions that are preferably used simultaneously therewith and that are explained in greater detail below.

Figure 2:
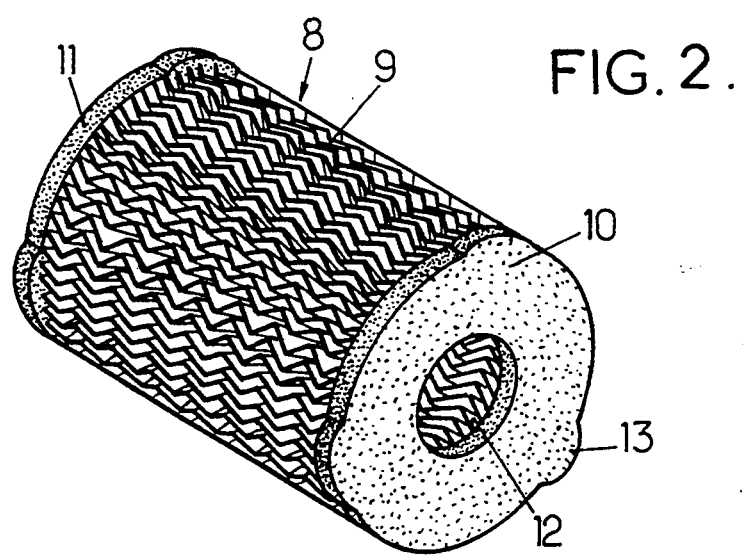

A preferred embodiment of the invention is described below by way of non-limiting example and with reference to the accompanying drawing, in which:

FIG. 1 shows a filter for liquid fitted with a filter cartridge of the invention; and FIG. 2 is a perspective view of said cartridge.

The filter described is designed to filter a liquid, preferably lubricating oil for an internal combustion engine.

It comprises:

- a rigid cylindrical housing 1 that is generally made of metal, having an end wall 2 that is pierced both by a tapped central bore 3 and by a ring of holes 4;
- a cover 5 mounted on the housing 1 in removable and sealed manner having a central hexagonal recess so that a hexagonal key can be used to screw the entire housing including its cover on and off on an appropriate prepared threaded coupling;
- a central perforated tube 7 which is described in greater detail below; and
- a removable filter cartridge 8.

The cartridge 8 itself comprises:

a cylindrical filter element 9; and two washers 10 and 11 in which the axial ends of the element 9 are embedded.

The element 9 is made of zig-zag accordion folded paper, i.e. paper folded along zig-zag bent lines both in the circumferential direction of the cartridge and in the axial direction thereof.

Each of the two washers 10 and 11 is made of a flexible and resilient plastics material such as a quick setting glue, and is relatively thick, in particular it may be about 5 mm thick, and more generally its thickness may lie in the range 3 mm to 8 mm.

One of the washers 10 extends radially towards the inside of the element 9 in the form of an annular rim 12.

Each of the two washers is also extended radially outwards by three centering lugs 13 suitable for coming into contact with the inside face of the housing 1.

The rigid tube 7 comprises:

a perforated tubular length 14 whose outside diameter is substantially equal to the inside diameter of the filter element 9 so as to be able to extend along the inside face of said element, thereby preventing undesirable deformations thereof, particularly under the pressure of the liquid to be filtered;

a collar 15 extending one of the axial ends of the length 14 radially inwards and radially outwards; and a cylindrical ring 16 extending said end axially, the ring itself being terminated by outside radial rim 17.

For fastening purposes, the rim 17 is suitable for co-operating with three resilient catches 18 included on the cover 5, and the ring 16 then serves to receive a helical compression spring 19 interposed between the inside portion of the collar 15 and the transverse wall of the cover.

The spring 19 constantly urges the tube 7 towards an annular shoulder 20 forming a portion of the end wall of the housing, which shoulder is advantageously overlaid by an inside portion of an annular rubber membrane 21 that acts as a non-return valve for liquid flow.

In the improved embodiment shown by way of non-limiting example, the inner portion of the collar 15 supports a cage 22 constituted in this case by three longitudinal bars, which cage is disposed inside the length 14 and contains a discharge valve member 23 biased by a spring 24.

As can clearly be seen in FIG. 1, the cartridge 8 is threaded over the tube 7 which is itself secured to the cover 5, and it can easily be separated from said tube merely by relative axial sliding once the cover 5 has been separated from the housing 1.

After being axially engaged on the tube 7, the smaller diameter annular portion of the washer 11 comes into abutment against the collar 15 of the tube, and the terminal edge T of said tube furthest from the collar 15 is disposed axially facing the inside rim 12 of the washer 10.

When the cover-tube-cartridge assembly is subsequently engaged in the housing 1, with such engagement being terminated by the cover 5 being closed, the resistance of the spring 19 to compression has the effect of pressing the above edge T axially and firmly against the shoulder 20 of the housing, with the rim 12 being clamped therebetween.

This clamping pressure is obtained by a small amount of axial deformation of the filter element 9, which deformation is facilitated by the zig-zag type of folding used.

Liquid-proof sealing is thus automatically ensured between each of the two washers 10 and 11 and the facing bearing surfaces of the housing 1 and/or of the tube 7.

After the cover 5 has been closed, the filter is ready to be screwed back onto the corresponding threaded endpiece (not shown) of the engine.

The path followed by the oil or other liquid to be filtered is then as shown by arrows.

The liquid is admitted through the holes 4 and after lifting the non-return membrane 21 slightly it enters the chamber 25 that surrounds the filter element 9.

Thereafter the liquid passes successively through the element 9 towards the center of the filter, thereby ensuring filtering, and then through the perforated tubular length 14 to reach the central chamber 26 from which it is evacuated axially through the tapped bore 3.

It should be observed that the above-described sealing between the filter cartridge and its support is reinforced by the fact that the pressure of the liquid against the cartridge is directed centripetally: the effect of the pressure is to press the inside cylindrical edge of the washer 11 radially towards the center against a facing cylindrical backing constituted by the tube 7.

Here also, such firm pressure is made possible by the fact that the cartridge lends itself easily to small amounts of resilient deformation, in this case radially.

As a result, whatever the embodiment adopted, a filter is obtained for liquid whose structure, assembly and disassembly, and operation can be understood sufficiently from the above.

This filter presents certain advantages over previously known filters, and in particular the following:

the removable filter cartridges fitted to such filters are easily discarded, recycled, or degraded since they do not include any metal components;

the cartridges are particularly cheap since they do not include a perforated rigid inside tube permanently associated therewith, but this does not prevent them from acting effectively as filters without deforming excessively since each of them is supported while in operation by a perforated rigid tube that is independent of the cartridge; and a cartridge is received in the housing that receives it without any need for a sealing gasket that is independent of the cartridge.

We claim:

1. A filter for liquid comprising:

a filter cartridge including a tubular filter element of paper folded in a "zigzag" accordion type of folding having no centrally perforated rigid tube, and two flexible, annular washers firmly secured at either end of said tubular filter element, wherein an inside diameter of one of said two washers is smaller than an inside diameter of said filter element; and a housing for receiving said filter cartridge and including a cylindrical tank, a cover, a perforated rigid tube mounted axially on said cover, the outside diameter of said tube being substantially equal to the inside diameter of said filter cartridge, and annular bearing surfaces at either end of said tube against which said two washers of said cartridge automatically come to bear when said cover fitted with said filter cartridge is installed on said tank, one of said annular bearing surfaces of said perforated rigid tube being a terminal axial edge of said perforated rigid tube suitable for bearing against a rim of said one of said two washers projecting radially inwardly from the inside surface of said filter cartridge.

2. A filter according to claim 1, wherein one of the annular bearing surfaces of said perforated rigid tube is an annular portion of the outside cylindrical face of said tube and is suitable for contiguously surrounding an inside cylindrical edge of one of said two washers.

3. A filter according to claim 1, wherein one of the annular bearing surfaces of said perforated rigid tube is a collar extending one end of said tube radially outwards and against which an inside portion of an outside transverse plane face of one of said two washers comes to bear axially.

4. A filter according to claim 1, further comprising a telescopic coupling interposed between said perforated rigid tube and said cover, said coupling urging said perforated rigid tube axially away from said cover said perforated rigid tube thereby compressing said rim of said one of said two washers.

5. A filter for liquid comprising:
- a filter cartridge including
  - a tubular filter element of folded paper having no centrally perforated rigid tube, and
  - two flexible, annular washers firmly secured at either end of said tubular filter element, wherein an inside diameter of one of said two washers is smaller than an inside diameter of said filter element;
- a housing for receiving said filter cartridge and including
  - a cylindrical tank,
  - a cover,
  - a perforated rigid tube mounted axially on said cover, the outside diameter of said tube being substantially equal to the inside diameter of said filter cartridge, and annular bearing surfaces at either end of said tube against which said two washers of said cartridge automatically come to bear when said cover fitted with said filter cartridge is installed on said tank; and
  - a telescopic coupling interposed between said perforated rigid tube and said cover, said coupling elastically urging said perforated rigid tube axially away from said cover, said perforated rigid tube thereby compressing said rim of said one of said two washers.

6. A filter according to claim 5, wherein the paper of said filter element is folded with a "zig-zag accordion" type of folding.

* * * * *